United States Patent
Johannes

(10) Patent No.: US 12,037,032 B2
(45) Date of Patent: Jul. 16, 2024

(54) METHOD FOR DETECTING SYSTEMATIC DEVIATIONS DURING DETERMINATION OF A MOVEMENT VARIABLE OF A GROUND-BASED, MORE PARTICULARLY RAIL-BASED, VEHICLE

(71) Applicant: Siemens Mobility GmbH, Munich (DE)

(72) Inventor: Lars Johannes, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 400 days.

(21) Appl. No.: 17/599,674

(22) PCT Filed: Feb. 28, 2020

(86) PCT No.: PCT/EP2020/055246
§ 371 (c)(1),
(2) Date: Sep. 29, 2021

(87) PCT Pub. No.: WO2020/200593
PCT Pub. Date: Oct. 8, 2020

(65) Prior Publication Data
US 2022/0185348 A1 Jun. 16, 2022

(30) Foreign Application Priority Data
Mar. 29, 2019 (DE) ...................... 10 2019 204 519.7

(51) Int. Cl.
*B61L 25/02* (2006.01)
*G01C 22/00* (2006.01)

(52) U.S. Cl.
CPC ............ *B61L 25/021* (2013.01); *G01C 22/00* (2013.01)

(58) Field of Classification Search
CPC .............................. B61L 25/021; G01C 22/00
See application file for complete search history.

(56) References Cited

U.S. PATENT DOCUMENTS

2005/0187698 A1\* 8/2005 Arai .................. B60W 50/0097
340/436
2008/0288192 A1\* 11/2008 Kumar .................. B60T 17/221
702/60

(Continued)

FOREIGN PATENT DOCUMENTS

DE 102014226612 \* 6/2016
DE 102014226612 A1 6/2016

(Continued)

*Primary Examiner* — Alexander Satanovsky
*Assistant Examiner* — Sharah Zaab
(74) *Attorney, Agent, or Firm* — Laurence A. Greenberg; Werner H. Stemer; Ralph E. Locher

(57) ABSTRACT

A method detects systematic deviations during a determination of a movement variable of a ground-based, more particularly rail-based, vehicle. To optimize the operation of the vehicle, more particularly to minimize operational restrictions during operation of the vehicle, the method proposes that—based on a measurement value, assigned to a time, of at least one sensor, a value, assigned to the time, of the movement variable is determined and—subject to the value, assigned to the time, of the movement variable and a statistical sensor accuracy value, determined for this value, of the at least one sensor, a test variable value, assigned to the time, is formed and is compared in a comparison with a predefined test bound in order to make an assumption regarding an existence of a systematic deviation. The assumption is subject to a comparison result obtained from the comparison.

19 Claims, 8 Drawing Sheets

(56) References Cited

U.S. PATENT DOCUMENTS

| | | | |
|---|---|---|---|
| 2012/0118735 A1* | 5/2012 | Calder | G01N 27/3272 |
| | | | 204/403.02 |
| 2012/0239297 A1* | 9/2012 | Yokota | G05B 15/02 |
| | | | 702/1 |
| 2013/0103225 A1* | 4/2013 | Kim | B60L 3/08 |
| | | | 701/1 |
| 2020/0023869 A1 | 1/2020 | Poesel | |

FOREIGN PATENT DOCUMENTS

| | | |
|---|---|---|
| DE | 102017212179 A1 | 1/2019 |
| WO | WO 2017121579 A1 | 7/2017 |
| WO | WO 2018177677 A1 | 10/2018 |

* cited by examiner

METHOD FOR DETECTING SYSTEMATIC DEVIATIONS DURING DETERMINATION OF A MOVEMENT VARIABLE OF A GROUND-BASED, MORE PARTICULARLY RAIL-BASED, VEHICLE

FIELD AND BACKGROUND OF THE INVENTION

The invention relates to a method for detecting systematic deviations during determination of a movement variable of a ground-based, more particularly rail-based, vehicle.

The invention also relates to an arrangement for detecting systematic deviations during determination of a movement variable of a ground-based, in particular rail-based, vehicle, which is suitably configured for carrying out the method according to the invention.

The invention further relates to a ground-based, in particular, a rail-based vehicle with an arrangement of this type.

During the operation of a ground-based vehicle, both the dynamic location of the vehicle—that is, the determination of the movement status by determining at least one movement variable of the vehicle—as well as the reliable calculation of so-called confidence interval limits for the at least one movement variable have a particular significance.

In the context of the present invention, the movement variable should be understood to be a physical variable which characterizes the movement state of the ground-based vehicle itself and/or on the basis of which, for example, by suitable calculations another variable can be determined, which then characterizes the movement status of the ground-based vehicle. Therefore, in the context of the invention, for example, the distance covered by the vehicle, the velocity of the vehicle and the acceleration of the vehicle are to be understood as being the movement variables. However, the position of the vehicle is also to be understood as a movement variable since, on the basis thereof, the distance covered can be determined.

In practice, these movement variables are designated locating variables. The determination of a movement variable (locating variable) takes place in relation to a reference system and/or in relation to a reference point in a reference system, wherein the reference system can be, for example, local or global.

The acquisition or capture of measurement values of one of these movement variables takes place in a known manner by means of sensors. In practice location sensors, in particular, are used as sensors. Known types of location sensors—that is, known sensor types for determining a movement variable—are incremental position sensors, Doppler radar sensors (Doppler radars, for short) and satellite navigation system receivers.

The capture of the measurement values is subject to errors which can be subdivided into random and systematic errors.

In particular, a sensor has its own random errors—that is that its own random error characteristic which is, or at least can be, different from the random error characteristic of other sensors.

In addition, sensors of a respective sensor type differ with regard to their random error characteristics from the sensors of other sensor types.

In the case of location sensors, for example, location sensors for determining the momentary distance covered or the momentary velocity, the systematic errors that underlie these can affect to a different extent the locating variable to be determined. The influences of the systematic errors on the determination of the respective locating variable can thus be expressed to a differing extent and often act together.

A systematic error can have at least one error component in the form of a systematic deviation (of a systematic effect) which originates from the respective sensor principle of the sensor type. Such a systematic deviation is designated an internal systematic deviation.

Furthermore, a systematic error can also have at least one error component in the form of a systematic deviation which is caused by the surrounding environment. Such a systematic deviation is then designated an external systematic deviation.

An example of a systematic error is an error caused by slipping of the wheels of an axle of the vehicle—that is, the slipping of the wheels during acceleration, which is known as spinning or wheelslip, and the slipping of the wheels during braking, which is also known as sliding or gliding.

An incremental position sensor associated with an axle of the vehicle measures too long a distance during spinning and too short a distance during sliding. A systematic error component caused by an axle control device during driving of an axle of a vehicle forms, for example, an internal systematic deviation. In contrast, a systematic error component caused by an irregularity of the coefficient of friction between the wheel and the ground or, in the case of a rail-bound vehicle, between the wheel and the rail, forms an external systematic deviation.

Typical external error sources during the acquisition of measurement values by means of a Doppler radar sensor result from the substrate structure and due to snow or ice which adheres to the Doppler radar sensor.

Currently, in practice, uniform limit values are specified, for example, for different sensors for the detection of systematic deviations (systematic effects), the existence of which makes a recalculation of the confidence intervals necessary. Therein, the limit values are often tuned such that they function reliably for the different or newly added sensors. Often, measurement values of sensors are smoothed before the comparison with the uniformly specified limit values. The smoothing, as a low pass filtration, can have a negative effect on the detection of sudden acceleration or braking processes. For example, an undershoot or an overshoot can occur during a determination of the velocity of the vehicle.

The specification and/or adjustment of limit values that are uniformly specified for all sensors can therefore lead thereto that, for example, during measurement with an incremental position sensor, gliding is often falsely detected and the confidence interval limits must then be increased. If the confidence interval limits are not reduced in a timely manner thereafter, this leads to operational restrictions during operation of the ground-based vehicle. For example, the vehicle, in particular a rail-based vehicle, must travel slower for a longer time and becomes delayed or it does not stop exactly within a door range in a station, or sometimes even forced braking is triggered.

SUMMARY OF THE INVENTION

It is an object of the invention to optimize the operation of a ground-based vehicle, in particular, to minimize the aforementioned operational restrictions during operation of the ground-based vehicle.

This object is achieved with methods for detecting systematic deviations during determination of a movement variable of a ground-based, in particular a rail-based, vehicle, wherein, on the basis of a measurement value associated with a time point, of at least one sensor, a value of the movement variable associated with the time point is determined, and wherein, dependent upon the value, associated with the time point, of the movement variable and upon a statistical sensor accuracy value of the at least one sensor determined for this value, a test variable value associated with the time point is formed and, in the course of a comparison, is compared with a specified test bound, in order to make an assumption dependent upon a comparison result obtained from the comparison, with regard to an existence of a systematic deviation.

According to the invention, for the making of the assumption regarding the existence of a systematic deviation, in particular, for the reliable demonstration of whether significant systematic deviations exist, can exist or do not exist, the previously determined statistical sensor accuracy value and thus a random error characteristic of the sensor used for measuring is taken into account. Thus, systematic deviations can advantageously be reliably differentiated from random deviations.

In an advantageous embodiment of the method according to the invention, it is provided that the operational state of a timer that has been started in the event of a previously made assumption that a systematic deviation exists is read out at the time point. On readout of the operational state of the timer, it is established whether it is running—that is, it is in its active operational state—or not—that is, it is in its passive operational state.

In an advantageous manner, it is then provided that the assumption regarding the existence of a systematic deviation is undertaken as follows:

if the test variable value associated with the time point is larger than the specified test bound, then the existence of a systematic deviation at the time point is assumed, if the test variable value is smaller than the specified test bound and the timer is also running, then the existence of a systematic deviation at the time point is not precluded, if the test variable value is smaller than the specified test bound and the timer is also not running, then the existence of a systematic deviation at the time point is precluded.

Preferably, an additional test variable value is formed and, in the course of an additional comparison, is compared with a specified additional test bound in order to make the assumption regarding the existence of a systematic deviation dependent also upon an additional comparison result obtained during the additional comparison.

In an advantageous manner, it is then provided that the assumption regarding the existence of a systematic deviation is undertaken as follows:

if the test variable value associated with the time point is larger than the specified test bound and/or if the additional test variable value is larger than the specified additional test bound, then the existence of a systematic deviation at the time point is assumed, if, firstly, the test variable value is smaller than the specified test bound and, secondly, the additional test variable value is smaller than the specified additional test bound and the timer is also running, then the existence of a systematic deviation at the time point is not precluded, if, firstly, the test variable value is smaller than the specified test bound and, secondly, the additional test variable value is smaller than the specified additional test bound and the timer is also not running, then the existence of a systematic deviation at the time point is precluded.

In the event that at least one further sensor provides a further measurement value associated with the time point, it is advantageously provided that on the basis of this further measurement value, a further value of the movement variable associated with the time point is determined and dependent upon the further value, associated with the time point, of the movement variable and upon a statistical sensor accuracy value of the further sensor determined for this further value, a test variable value associated with the time point is formed and, in the course of a further comparison, is compared with the specified test bound, in order to make the assumption regarding the existence of a systematic deviation also dependent upon a further comparison result obtained from the further comparison.

In an advantageous manner, it is then provided that the assumption regarding the existence of a systematic deviation is undertaken as follows:

if the test variable value associated with the time point is larger than the specified test bound and/or if the further test variable value associated with the time point is larger than the specified test bound, then the existence of a systematic deviation at the time point is assumed, if the test variable value associated with the time point and the further test variable value associated with the time point is smaller than the specified test bound and the timer is also running, then the existence of a systematic deviation at the time point is not precluded, if the test variable value associated with the time point and the further test variable value associated with the time point are smaller than the specified test bound and the timer is also not running, then the existence of a systematic deviation at the time point is precluded.

Preferably, an additional further test variable value is formed and, in the course of an additional comparison, is compared with the specified additional test bound in order to make the assumption regarding the existence of a systematic deviation dependent also upon an additional comparison result obtained during the additional further comparison.

In an advantageous manner, it is then provided that the assumption regarding the existence of a systematic deviation is made as follows:

if at least one of the following conditions applies:

the test variable value associated with the time point is larger than the specified test bound, the further test variable value associated with the time point is larger than the specified test bound, the additional test variable value associated with the time point is larger than the specified test bound, the additional further test variable value associated with the time point is larger than the specified additional test bound, then the existence of a systematic deviation at the time point is assumed, if, firstly, the test variable value and the further test variable value are smaller than the specified test bound and, secondly, the additional test variable value and the additional further test variable value are smaller than the specified additional test bound and the timer is also running, then the existence of a systematic deviation at the time point is not precluded, if, firstly, the test variable value and the further test variable value are smaller than the specified test bound and, secondly, the additional test variable value and the additional further test variable value are smaller than the specified additional test bound and the timer is also not running, then the existence of a systematic deviation at the time point is precluded.

By means of the method according to the invention, for the determination of the movement state of the ground-based vehicle, it can be assessed better than previously known in practice whether it is to be assumed that the measurement value associated with the time point is and/or could be subject to a significant systematic deviation or whether this can be precluded. This has the advantage that confidence interval limits can be calculated more optimally and reliably.

Preferably, the statistical sensor accuracy value is determined on the basis of a sensor characteristic curve or a sensor function determined for the at least one sensor.

For this purpose, it is advantageously provided that during a real or simulated test journey of the vehicle or of a test vehicle used in its place, by means of the at least one sensor or a test sensor of the same sensor type used in its place, test measurement values are captured and, on the basis of these test measurement values, test values of the movement variable are determined and that on the basis of the test values of the movement variable for the at least one sensor, a variation of its statistical sensor accuracy is determined dependent upon the movement variable in the form of the respective sensor characteristic and/or sensor function.

In order to keep the proportion of systematic deviations in the movement variable as minimal as possible during the test journey, it is regarded as advantageous if the movement variable of the vehicle and/or of the test vehicle used in its place during the test journey is changed, in particular, by means of careful acceleration and careful braking, such that a slipping of the wheels of the vehicle on the ground or the rails is substantially prevented.

Furthermore, it is regarded as advantageous if
by means of a low pass filtration, low pass filter values are formed from the test values,
for each of the test values on the basis of the low pass filter values, a sliding standard deviation is determined, and
a regression line is fitted into a representation formed thereafter of the sliding standard deviations over the moduli of the test values, in particular with the aid of the least squares method, wherein the regression line shows the variation of the statistical sensor accuracy of the at least one sensor dependent upon the movement variable.

Furthermore, it is regarded as advantageous if
on the basis of a movement model applied to a previous system state of the vehicle, an expected system state of the vehicle is determined for the time point,
on the basis of a transfer model applied to the expected system state, an expected value of the movement variable for the time point is determined, and
the difference between the value of the movement variable and the expected value of the movement variable is determined as an innovation value.

It is then preferably provided that
on the basis of the movement model applied to an expected system state accuracy value and a transfer model applied to a specified system noise, a system state accuracy value of the expected system state is determined,
on the basis of the system state accuracy value of the expected system state and of the transfer model, an accuracy value of the expected value of the movement variable is determined,
the total of the accuracy value of the expected value of the movement variable and the sensor accuracy value is determined as the innovation accuracy value, and
the quotient of the modulus of the innovation value and the innovation accuracy value as the test variable value is determined.

It is then preferably provided that
a residual value is determined as the product of the innovation value and a specified weighting factor,
a residual value accuracy value is determined as the product of the weighting factor multiplied by minus one and the sensor accuracy value, and
the quotient of the modulus of the residual value and the residual accuracy value is determined as the additional test variable value.

Firstly, it is regarded as advantageous if one test bound is preferably determined as a quantile of the standard normal distribution of the order $1-\alpha/2$, wherein a value is specified for $\alpha$ as the probability of error.

Secondly, it is regarded as advantageous if the additional test bound is preferably determined as a quantile of the standard normal distribution of the order $1-\alpha/2$, wherein an additional value is specified for $\alpha$ as the probability of error.

The invention will now be described in greater detail by reference to the drawings.

DETAILED DESCRIPTION OF THE INVENTION

Figure 1:
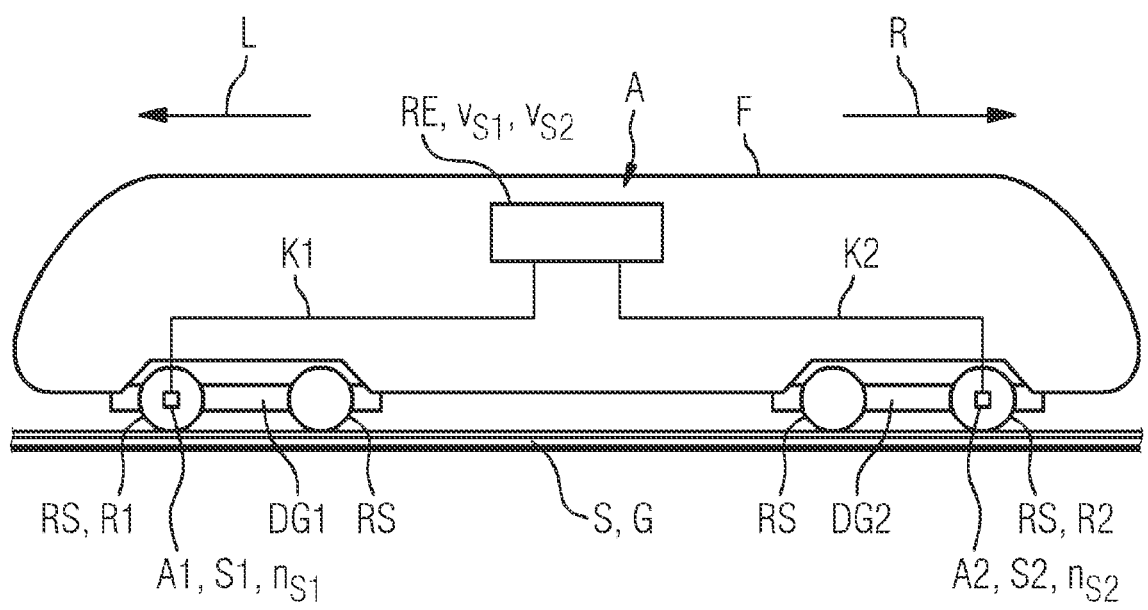
FIG. 1 is a ground-based vehicle according to the invention with an arrangement according to the invention for detecting systematic deviations during determination of a movement variable of the vehicle.

FIG. 1 shows a ground-based vehicle F in the form of a rail-bound vehicle. The vehicle F is, for example, a locomotive. The vehicle F can move, in the usual manner, on the rails S of a track G in the travel directions L and R. It has wheel trucks DG1, DG2, each having two wheelsets RS.

In the exemplary embodiment shown, the detection of systematic deviations takes place using two sensors S1 and S2, wherein they are incremental position sensors of the same sensor type. The two sensors S1 and S2 can therefore be, for example, of the Hasler® OPG sensor type from Sécheron Hasler Group. Alternatively, the two sensors can be, for example, of the sensor type BMIV from Baumer Electric. It should be noted, however, that for the execution of the method according to the invention, a single sensor, for example, the sensor S1 is also sufficient, as will be shown below, in particular, also in relation to the descriptions regarding FIG. 3.

One of the two sensors which is identified as S1 is associated with one axle A1 of one of the wheelsets RS of one wheel truck DG1 and the other sensor which is identified as S2 is associated with an axle A2 of one of the wheelsets RS of the further wheel truck DG2.

A computer unit RE is linked via communication paths K1 and K2 to the sensors S1 and S2. Furthermore, a timer is provided as a component of the computer unit RE. The timer T could however also be provided separately from the computer unit RE and connected via a suitable communication path to the computer unit RE.

The first sensor S1 serves for capturing measurement values $n_{S1}$ of the rotary speed of the axle A1 of one wheel truck DG1 on the basis of which, in a known manner, specifically taking account of a diameter of a wheel R1 fastened to the axle A1, the computer unit RE determines velocity values $v_{S1}$ of the vehicle F as values of the movement variable v. The velocity v of the vehicle F thus herein represents the movement variable.

In the same way, the second sensor serves for capturing further measurement values $n_{S2}$ of the rotary speed of the axle A2 of the further wheel truck DG2 on the basis of which, taking account of a diameter of a wheel R2 fastened to the axle A2, the computer unit RE determines further velocity values $v_{S2}$ of the vehicle F as further values of the movement variable v. The velocity v of the vehicle F thus herein represents the movement variable.

The measurement values $n_{S1}$ of the first sensor pass via one communication path K1 to the computer unit RE and the further measurement values $n_{S2}$ pass via the further communication path K2 to the computer unit.

It could, however, also be provided that a sensor computation unit of the sensor S1 itself determines the velocity values $v_{S1}$ of the vehicle F from the measurement values $n_{S1}$ of the rotary speed of the axle A1 and outputs them via the communication paths K1 to the computer unit RE and that, in a corresponding manner, a further sensor computation unit of the sensor S2 itself determines the velocity values $v_{S2}$ of the vehicle F from the measurement values $n_{S2}$ of the rotary speed of the axle A2 and outputs them via the further communication path K2 to the computer unit RE.

The sensors S1 and S2, the computer unit RE with its timer T and the communication paths K1 and K2 together form the arrangement A which is suitably configured for detecting systematic deviations sA in the determination of the movement variable v of the vehicle F. The arrangement is suitably configured, in particular, for carrying out the method described below which is subdivided into two partial methods.

By means of a first of the two partial methods, initially a typical random error characteristic is reliably determined for each of the sensors S1 and S2 used.

Following thereafter is the second partial method which uses the typical random error characteristic established once for each of the sensors S1 and S2, in order to reveal significant systematic error influences; thus in order to differentiate systematic deviations (effects) reliably from random deviations (effects).

Alternatively thereto, merely a typical random error characteristic of the sensor type used of the two sensors and on use of sensors of different sensor types, a typical random error characteristic could also be determined for each of the different sensor types.

In addition, the method also functions very efficiently if only one sensor or if any number of sensors are used simultaneously.

In addition, in place of the sensor S1, a test sensor of the same type as the sensor S1 and/or in place of the further sensor S2, a further test sensor of the same sensor type as the further sensor S2 could also be used.

Figure 2:
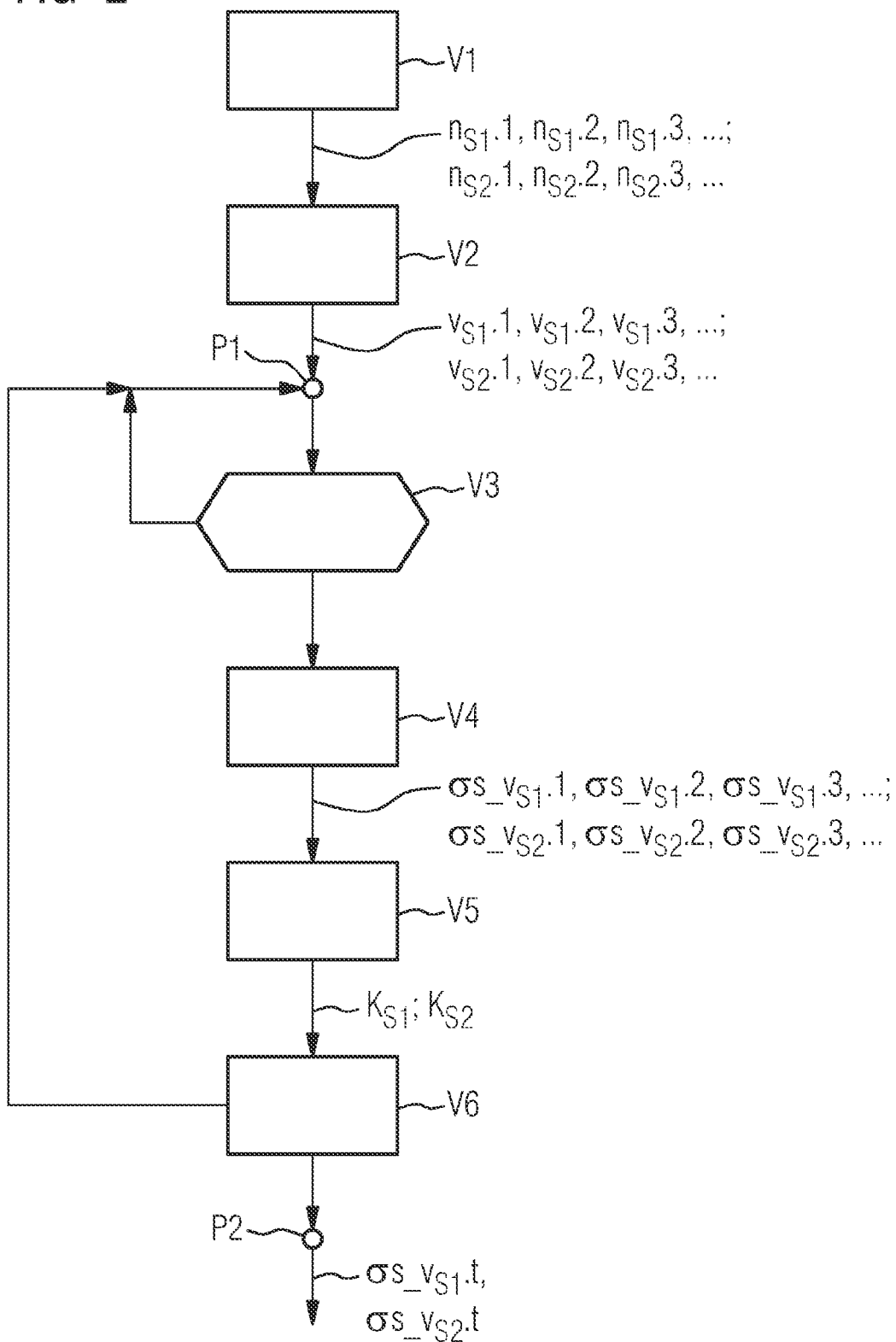
FIG. 2 is a flow diagram of a first partial method of a method according to the invention for detecting systematic deviations during determination of a movement variable of the vehicle.

According to FIG. 2, the first of the two partial methods which is also known below as the calibration method or the autocalibration method, essentially comprises the following method steps:

Firstly, during a real test journey of the vehicle F, in a method step V1, by means of one sensor S1, test measurement values $n_{S1}.1$, $n_{S1}.2$, $n_{S1}.3$, ... of the axle rotary speed $n_{S1}$ and by means of the further sensor S2, further test measurement values $n_{S2}.1$, $n_{S2}.2$, $n_{S2}.3$, ... of the axle rotary speed $n_{S2}$ are captured. During this test journey, the velocity, which here forms the movement variable v of the vehicle, is changed, in particular, by means of careful accelerations and careful braking such that slipping of the wheels of the vehicle F on the ground and/or here particularly on the rails S of the track G is substantially prevented.

The test journey could be a simulated test journey. Alternatively such test measurement values could also be captured during a real or simulated test journey of a test vehicle used in place of the vehicle F.

A sensor computation unit (not shown) of the sensor S1 or the computer unit RE then determines, in a method step identified here as V2, using the test measurement values $n_{S1}.1$, $n_{S1}.2$, $n_{S1}.3$, ..., test values $v_{S1}.1$, $v_{S1}.2$, $v_{S1}.3$, ... of the movement variable v. In addition, a further sensor computation unit (not shown) of the further sensor S2 or the computer unit RE determines, using the further test measurement values $n_{S2}.1$, $n_{S2}.2$, $n_{S2}.3$, ..., further test values $v_{S2}.1$, $v_{S2}.2$, $v_{S2}.3$, ... of the movement variable v.

Subsequently, the computer unit RE then determines from the test values $v_{S1}.1$, $v_{S1}.2$, $v_{S1}.3$, ... for one sensor S1, a variation of a statistical sensor accuracy $\sigma s\_v_{S1}$ dependent upon the movement variable v in the form of a sensor characteristic curve $K_{S1}$. Accordingly, the computer unit RE then determines from the further test values $v_{S2}.1$, $v_{S2}.2$, $v_{S2}.3$, ... for the further sensor S2, a variation of a statistical sensor accuracy $\sigma s\_v_{S2}$ dependent upon the movement variable v in the form of a further sensor characteristic curve $K_{S2}$.

In place of the sensor characteristic curves $K_{S1}$, $K_{S2}$, sensor functions which represent the sensor characteristic curves $K_{S1}$, $K_{S2}$ could also be determined.

For this purpose, in a method step denoted as V3 herein, the computer unit RE firstly checks whether the vehicle has passed through at least three acceleration and deceleration phases during the test journey and whether between each of these phases, it has made a stop of at least 3 s. If this is not the case, the test journey must be continued until these conditions are met. If this is the case, the computer unit carries out the next method step denoted as V4 here.

In the method step V4, by means of a low pass filtration, the computer unit RE initially forms low pass filter values from the test values $v_{S1}.1$, $v_{S1}.2$, $v_{S1}.3$, ... of the at least one sensor S1 or the test sensor used in its place. Subsequently, for each of the test values $v_{S1}.1$, $v_{S1}.2$, $v_{S1}.3$, ..., the computer unit RE determines a sliding standard deviation $\sigma s\_v_{S1}.1$, $\sigma s\_v_{S1}.2$, $\sigma s\_v_{S1}.3$, ... on the basis of the low pass filter values. Accordingly, in the method step V4, by means of a low pass filtration, the computer unit RE firstly forms further low pass filter values from the test values $v_{S2}.1$, $v_{S2}.2$, $v_{S2}.3$, ... of the at least one further sensor S2 and/or the further test sensor used in its place. Subsequently, for each of the further test values $v_{S2}.1$, $v_{S2}.2$, $v_{S2}.3$, ..., the computer unit RE determines a further sliding standard deviation $\sigma s\_v_{S2}.1$, $\sigma s\_v_{S2}.2$, $\sigma s\_v_{S2}.3$, ... on the basis of the further low pass filter values.

In a method step denoted here as V5, into a representation of the sliding standard deviations $\sigma s\_v_{S1}.1$, $\sigma s\_v_{S1}.2$, $\sigma s\_v_{S1}.3$, ..., the computer unit RE fits a regression line as the sensor characteristic curve $K_{S1}$ over the moduli $|v_{S1}.1|$, $|v_{S1}.2|$, $|v_{S1}.3|$, ... of the test values $v_{S1}.1$, $v_{S1}.2$, $v_{S1}.3$, .... The fitting of the regression line takes place, in particular, with the aid of the per se known least squares method. The regression line reveals the variation of the statistical sensor accuracy $\sigma s\_v_{S1}$ of the one sensor S1, dependent upon the movement variable v. Accordingly, into a representation of the further sliding standard deviations $\sigma s\_v_{S2}.1$, $\sigma s\_v_{S2}.2$, $\sigma s\_v_{S2}.3$, ..., the computer unit RE fits a further regression line as the sensor characteristic curve $K_{S2}$ over the moduli $|v_{S2}.1|$, $|v_{S1}.2|$, $|v_{S2}.3|$, ... of the test values $v_{S2}.1$, $v_{S2}.2$, $v_{S2}.3$, .... The fitting of the further regression line takes place, in particular, with the aid of the per se known least squares method. This further regression line reveals the variation of the statistical sensor accuracy $\sigma s\_v_{S2}$ of the further sensor S2, dependent upon the movement variable v.

In a method step denoted here as V6, the one sensor characteristic curve $K_{S1}$ and the further sensor characteristic curve $K_{S2}$ are stored along with additional details in a memory store of the computer unit RE.

The computer unit thus carries out the method steps V4, V5 and V6 simultaneously or temporally offset both for the test values $v_{S1}.1$, $v_{S1}.2$, $v_{S1}.3$, ... of the sensor S1 and also for the further test values $v_{S2}.1$, $v_{S2}.2$, $v_{S2}.3$, ... of the further sensor S2.

Figure 3:
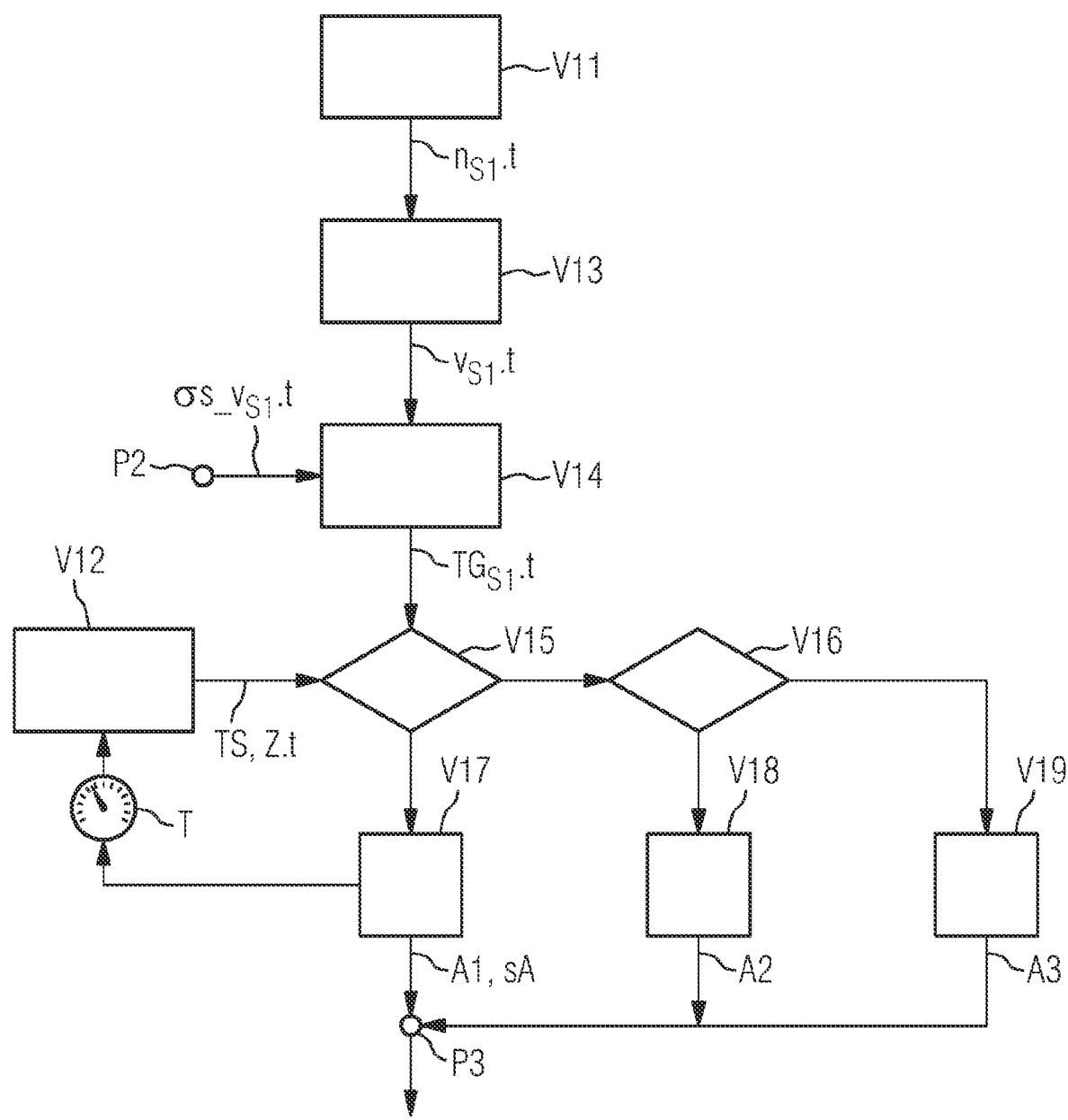
FIGS. 3 to 6 are flow diagrams of four embodiments of a second partial method of the method according to the invention.

According to FIG. 3, a first embodiment of the second of the two partial methods substantially comprises the following method steps:

In a method step denoted here as V11, the sensor S1 captures a measurement value $n_{S1}.t$, associated with the time point t, of the axle rotary speed $n_{S1}$ of the axle A1 of one wheel truck DG1.

In addition, in a method step, denoted here as V12, the operational state Z.t of the timer T at the time point t is read out. The timer T can assume two operational states. Once it has been started and is running, it is in an active operational state. If it is not running, then it is in a passive operational state. The timer is always started or restarted as soon as an assumption A1 has been made by the computer unit RE that a systematic deviation sA exists.

In the method step V12, a test bound TS is also specified. Preferably, this test bound TS is determined as a quantile of the standard normal distribution of the order $1-\alpha/2$. Herein, a value $W\alpha$ is specified for $\alpha$ as the probability of error. This value $W\alpha$ can be stored in a memory store (not shown here) of the computer unit RE.

In a method step denoted here as V13, the computer unit RE determines, on the basis of the measurement value $n_{S1}.t$ and, taking account of the diameter of the wheel R1 fastened to the axle A1, a value $v_{S1}.t$ of the movement variable v associated with the time point t.

In a method step denoted here as V14, on the basis of the sensor characteristic curve $K_{S1}$ previously determined for the at least one sensor S1, a statistical sensor accuracy value $\sigma s\_v_{S1}.t$ is determined for the value $v_{S1}.t$ of the movement variable v in that this statistical sensor accuracy value $\sigma s\_v_{S1}.t$ is read out at the interface denoted here as P2 from the memory store (not shown) of the computer unit RE.

In addition, in the method step V14, dependent upon the value $v_{S1}.t$ of the movement variable v associated with the time point t and of the statistical sensor accuracy value $\sigma s\_v_{S1}.t$ of the sensor S1 determined for this value $v_{S1}.t$, a test variable value $TG_{S1}.t$ associated with the time point t is formed.

Figure 7:
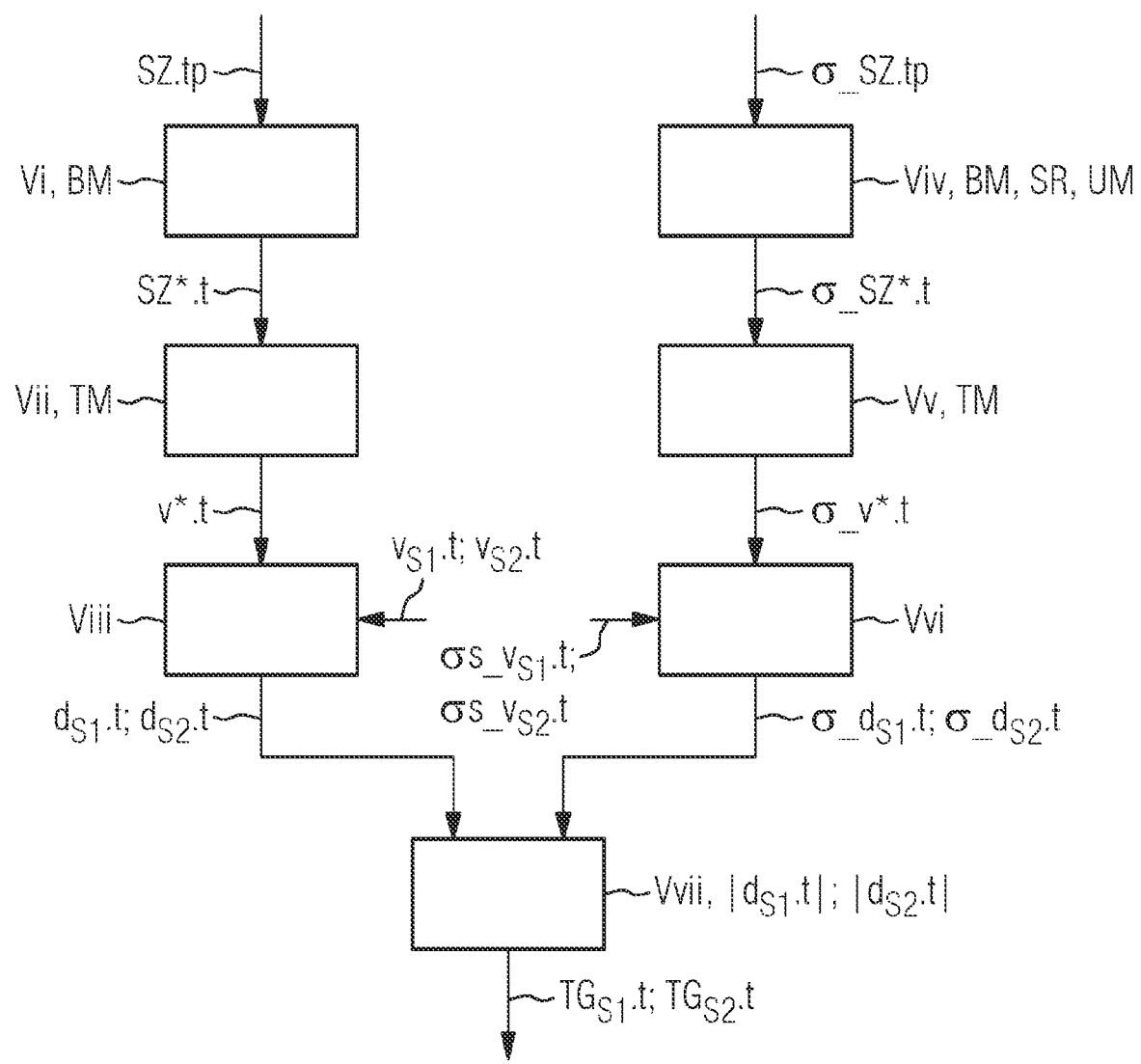
FIGS. 7 and 8 are substeps of the method steps shown in FIGS. 3 to 6.

The formation of the test variable value $TG_{S1}.t$ takes place according to the substeps Vi to Vvii of the method step V14 of FIG. 7.

In a substep denoted here as Vi, on the basis of a movement model BM applied to a previous system state SZ.tp of the vehicle F, an expected system state SZ*.t of the vehicle F for the time point t is determined.

In a substep denoted here as Vii, on the basis of a transfer model TM applied to the expected system state SZ*.t, an expected value v*.t of the movement variable v is determined for the time point t.

In a substep denoted here as Viii, the difference between the value $v_{S1}.t$ of the movement variable v and the expected value v*.t of the movement variable v is determined as an innovation value $d_{S1}.t$.

In a substep denoted here as Viv, on the basis of the movement model BM applied to a previous system state accuracy value $\sigma\_SZ.tp$ and a transmission model UM applied to a specified system noise SR, a system state accuracy value $\sigma\_SZ*.t$ of the expected system state SZ*.t is determined.

In a substep denoted here as Vv, on the basis of the system state accuracy value $\sigma\_SZ*.t$ of the expected system state SZ*.t and of the transfer model TM, an accuracy value $\sigma\_v*.t$ of the expected value v*.t of the movement variable v is determined.

In a substep denoted here as Vvi, the sum of the accuracy value $\sigma\_v*.t$ of the expected value v*.t of the movement variable v and the sensor accuracy value $\sigma s\_v_{S1}.t$ is determined as an innovation accuracy value $\sigma\_d_{S1}.t$.

And in a substep denoted here as Vvii, the quotient is determined from the modulus $|d_{S1}.t|$ of the innovation value $d_{S1}.t$ and the innovation accuracy value $\sigma\_d_{S1}.t$ as the test variable value $TG_{S1}.t$.

After the formation of the test variable value $TG_{S1}.t$, in the method step denoted as V15 in FIG. 3, on a comparison, the test variable value $TG_{S1}.t$ is compared with the specified test bound TS in order, dependent upon a comparison result obtained in the comparison, to make an assumption A1, A2 or A3 regarding an existence of a systematic deviation sA.

In the method step denoted as V16, it is tested whether the timer T is running.

The assumption regarding the existence of a systematic deviation (sA) is made as follows:
- if the test variable value $TG_{S1}.t$ associated with the time point t is larger than the specified test bound TS, then the existence of a systematic deviation sA at the time point t is assumed in the method step denoted as V17 and the timer T is started or restarted,
- if the test variable value $TG_{S1}.t$ is smaller than the specified test bound TS and the timer T is also running, then in the method step denoted as V18, the existence of a systematic deviation sA at the time point t is not precluded, and
- if the test variable value $TG_{S1}.t$ is smaller than the specified test bound TS and the timer T is also not running, then in the method step denoted as V19, the existence of a systematic deviation sA at the time point t is precluded.

Figure 4:
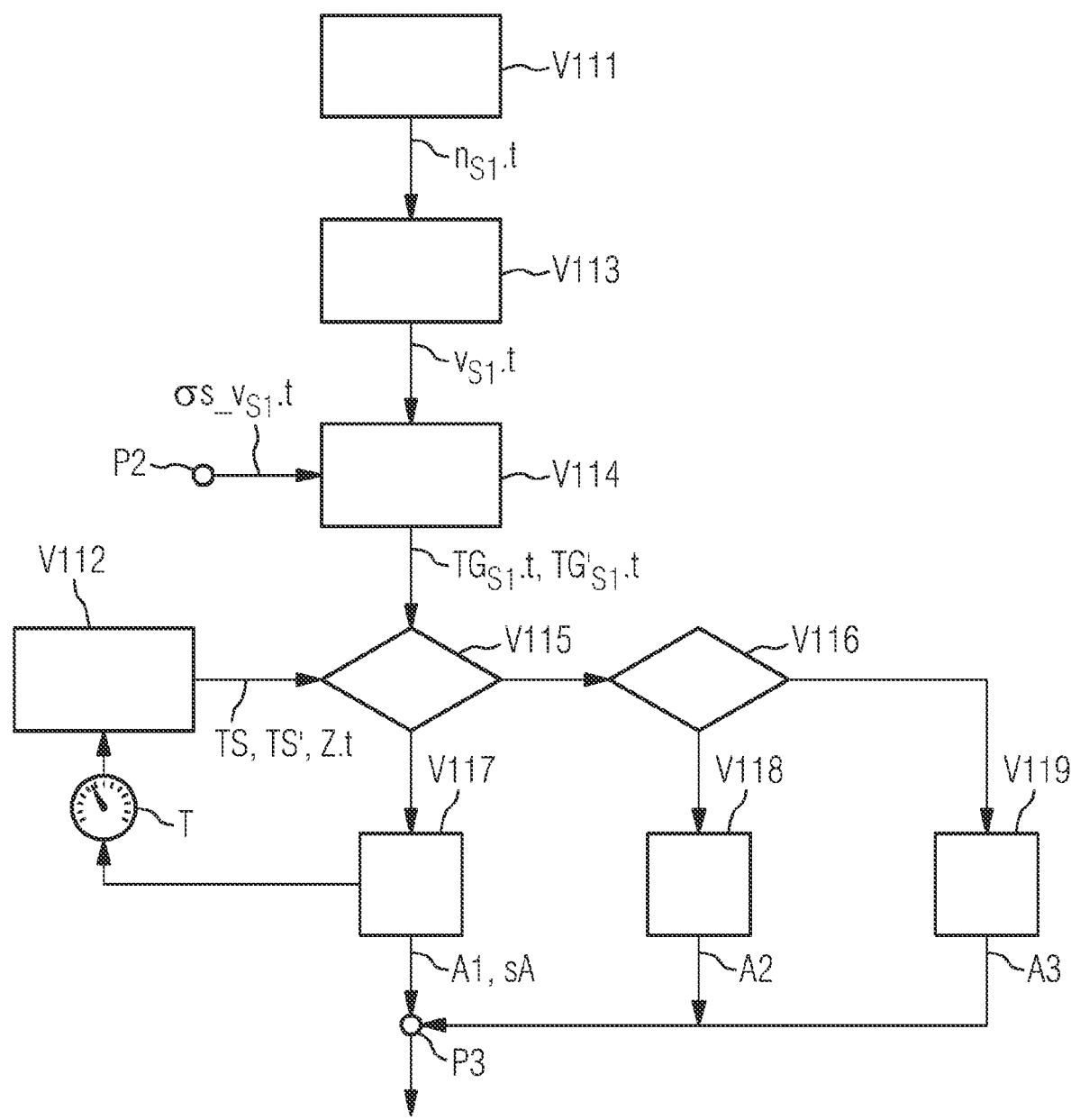

According to FIG. 4, a second embodiment of the second of the two partial methods substantially comprises the following method steps:

In a method step denoted here as V111, the sensor S1 captures a measurement value $n_{S1}.t$, associated with the time point t, of the axle rotary speed $n_{S1}$ of the axle A1 of one wheel truck DG1.

In addition, in a method step, denoted here as V112, the operational state Z.t of the timer T at the time point t is read out. The timer T can assume two operational states. Once it has been started and is running, it is in an active operational state. If it is not running, then it is in a passive operational state. The timer is always started or restarted as soon as an assumption A1 has been made by the computer unit RE that a systematic deviation sA exists.

In the method step V112, a test bound TS and an additional test bound TS' are specified. Preferably, the test bound TS is again determined as a quantile of the standard normal distribution of the order $1-\alpha/2$ and for $\alpha$, a value $W\alpha$ is specified as the probability of error. The additional test bound TS' is preferably determined as a quantile of the standard normal distribution of the order $1-\alpha/2$, wherein an additional value W'a is specified for a as the probability of error. The values $W\alpha$ and $W'\alpha$ can again be stored in a memory store of the computer unit RE.

In the method step denoted here as V113, the computer unit RE determines, on the basis of the measurement value $n_{S1}.t$ and, taking account of the diameter of the wheel R1 fastened on the axle A1, a value $v_{S1}.t$ of the movement variable v associated with the time point t.

In the method step denoted here as V114, on the basis of the sensor characteristic curve $K_{S1}$ previously determined for the at least one sensor S1, a statistical sensor accuracy value $\sigma s\_v_{S1}.t$ for the value $v_{S1}.t$ of the movement variable v is determined in that this statistical sensor accuracy value $\sigma s\_v_{S1}.t$ is read out at the interface denoted here as P2 from the memory store (not shown) of the computer unit RE.

In addition, in the method step V114, dependent upon the value $v_{S1}.t$ of the movement variable v associated with the time point t and of the statistical sensor accuracy value $\sigma s\_v_{S1}.t$ of the sensor S1 determined for this value $v_{S1}.t$, a test variable value $TG_{S1}.t$ associated with the time point t is formed.

The formation of the test variable value $TG_{S1}.t$ again takes place according to the substeps Vi to Vvii of FIG. 7.

Additionally, in the method step V114 an additional test variable value $TG'_{S1}.t$ which is associated with the time point t is formed.

Figure 8:
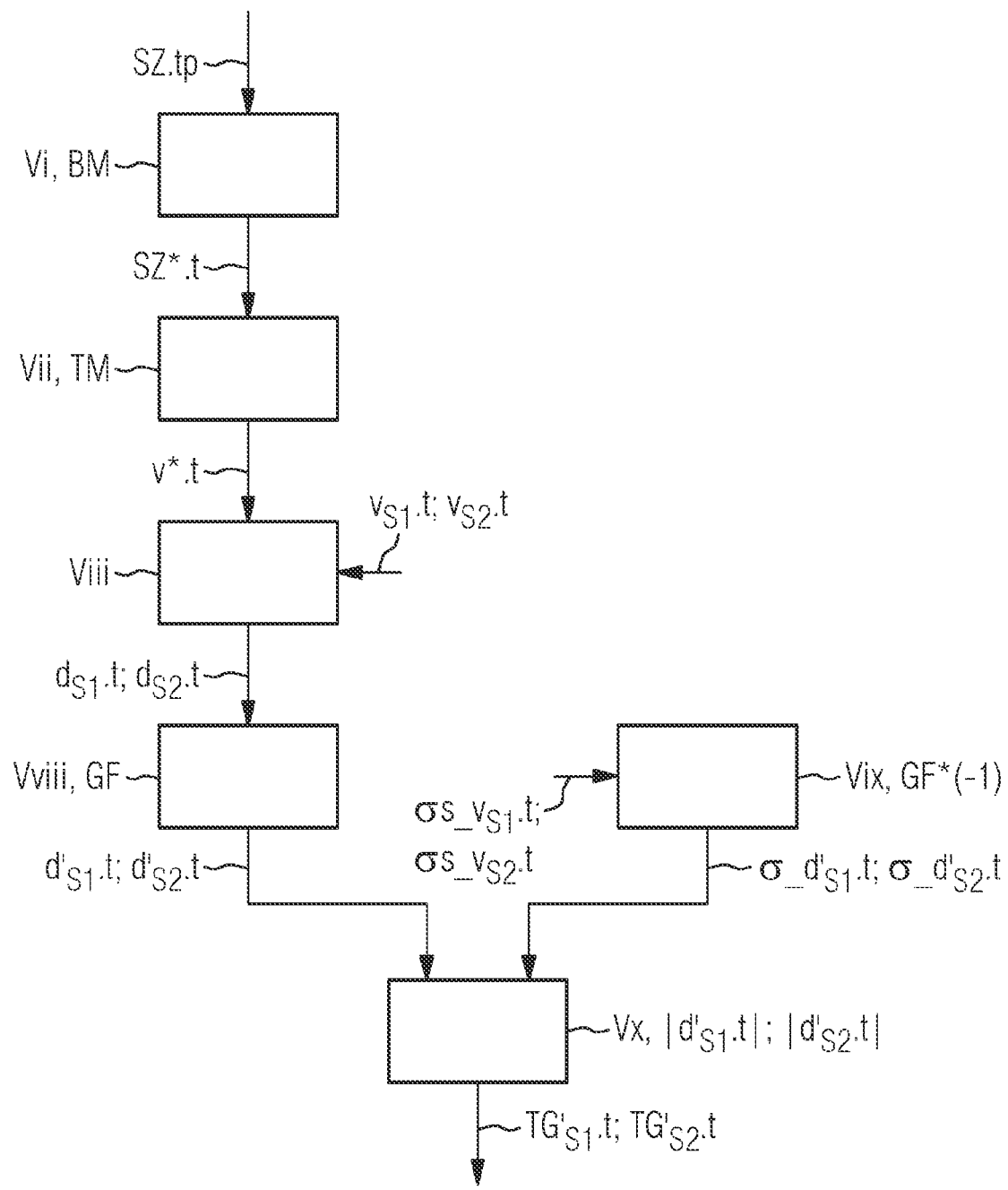

According to FIG. 8, firstly the substeps Vi, Vii and Viii already known from FIG. 7, to which the substeps Vviii, Vix and Vx are attached, serve for forming the additional test variable value $TG'_{S1}.t$.

In the substep denoted here as Vviii, a residual value $d'_{S1}.t$ is determined as the product of the innovation value $d_{S1}.t$ and a specified weighting factor GF.

In the substep denoted here as Vix, a residual accuracy value $\sigma\_d'_{S1}.t$ is determined as the product of the weighting factor GF multiplied by minus one and the sensor accuracy value $\sigma s\_v_{S1}.t$.

And in the substep denoted here as Vx, the quotient is determined from the modulus $|d'_{S1}.t|$ of the residual value $d'_{S1}.t$ and the residual accuracy value $s\_d'_{S1}.t$ as the additional test variable value $TG'_{S1}.t$.

After the formation of the test variable value $TG_{S1}.t$ and the additional test variable value $TG'_{S1}.t$, in the method step denoted as V115 in FIG. 4, on a comparison, the test variable value $TG_{S1}.t$ is compared with the specified test bound TS. Furthermore, on an additional comparison, the additional test variable value $TG'_{S1}.t$ is compared with the specified additional test bound TS'.

In the method step denoted as V116, it is tested again whether the timer T is running.

The assumption regarding the existence of a systematic deviation sA is made as follows:

if the test variable value $TG_{S1}.t$ associated with the time point t is larger than the specified test bound TS and/or if the additional test variable value $TG'_{S1}.t$ is larger than the specified additional test bound TS', then in the method step V117, the existence of a systematic deviation sA at the time point t is assumed and the timer T is started or restarted, if, firstly, the test variable value $TG_{S1}.t$ is smaller than the specified test bound TS and, secondly, the additional test variable value $TG'_{S1}.t$ is smaller than the specified additional test bound TS' and the timer T is also running, then in the method step V118, the existence of a systematic deviation sA at the time point t is not precluded, if, firstly, the test variable value $TG_{S1}.t$ is smaller than the specified test bound TS and, secondly, the additional test variable value $TG'_{S1}.t$ is smaller than the specified additional test bound TS' and the timer T is also not running, then in the method step V119, the existence of a systematic deviation sA at the time point t is precluded.

Figure 5:
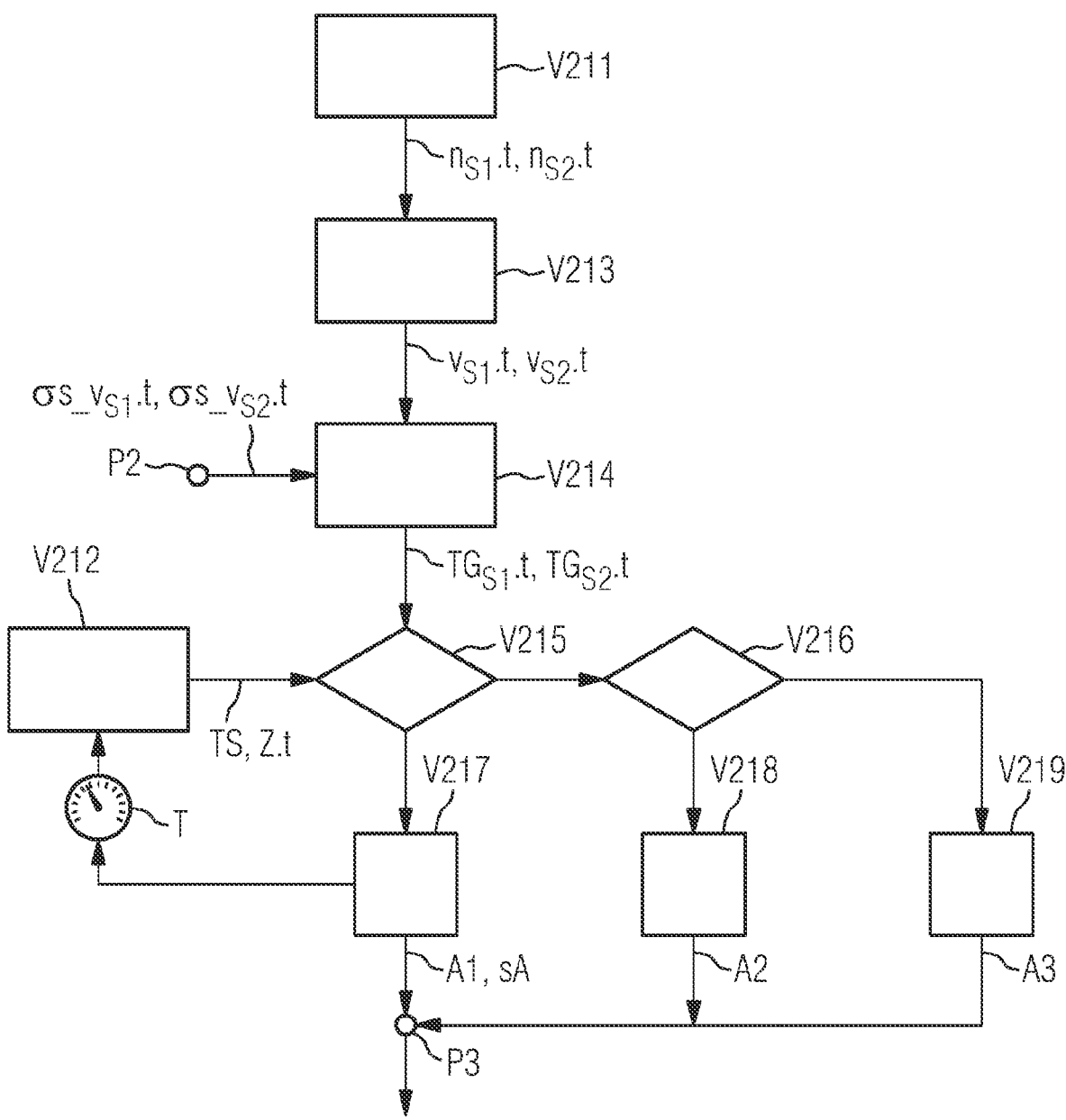

FIG. 5 shows a third embodiment of the second of the two partial methods. This is used if the further sensor S2 provides a further measurement value $n_{S2}.t$ associated with the time point t.

Then the following method steps are carried out:

In the method step denoted here as V211, the sensor S1 captures a measurement value $n_{S1}.t$, associated with the time point t, of the axle rotary speed $n_{S1}$ of the axle A1 of the wheel truck DG1. And the sensor S2 captures a further measurement value $n_{S1}.t$, associated with the time point t, of the axle rotary speed $n_{S2}$ of the axle A2 of the wheel truck DG2.

In a method step denoted here as V212, the operational state Z.t of the timer T at the time point t is read out. The timer T can again assume two operational states. Once it has been started and is running, it is in an active operational state. If it is not running, then it is in a passive operational state. Here also, the timer is always started or restarted as soon as an assumption A1 has been made by the computer unit RE that a systematic deviation sA exists.

In the method step V212, a test bound TS is again also specified. Preferably, this test bound TS is determined as a quantile of the standard normal distribution of the order $1-\alpha/2$. Herein, a value $W\alpha$ is specified for $\alpha$ as the probability of error. This value $W\alpha$ can be stored in a memory store (not shown here) of the computer unit RE.

In the method step V213, the computer unit RE determines, on the basis of the measurement value $n_{S1}.t$ and taking account of the diameter of the wheel R1 fastened to the axle A1, a value $v_{S1}.t$ of the movement variable v associated with the time point t. In addition, the computer unit RE determines, on the basis of the further measurement value $n_{S2}.t$ and taking account of the diameter of the wheel R2 fastened to the axle A2, a further value $v_{S2}.t$ of the movement variable v associated with the time point t.

In a method step denoted here as V214, on the basis of the sensor characteristic curve $K_{S1}$ previously determined for the one sensor S1, a statistical sensor accuracy value $\sigma s\_v_{S1}.t$ is determined for the value $v_{S1}.t$ of the movement variable v in that this statistical sensor accuracy value $\sigma s\_v_{S1}.t$ is read out at the interface denoted here as P2 from the memory store (not shown) of the computer unit RE. In addition, in the method step denoted here as V214, on the basis of the sensor characteristic curve $K_{S2}$ previously determined for the further sensor S2, a further statistical sensor accuracy value $\sigma s\_v_{S2}.t$ for the further value $v_{S2}.t$ of the movement variable v is determined in that this further statistical sensor accuracy value $\sigma s\_v_{S2}.t$ is read out at the interface P2 from the memory store (not shown) of the computer unit RE.

In addition, firstly, in the method step V214, dependent upon the value $v_{S1}.t$ of the movement variable v associated with the time point t and of the statistical sensor accuracy value $\sigma s\_v_{S1}.t$ of the sensor S1 determined for this value $v_{S1}.t$, a test variable value $TG_{S1}.t$ associated with the time point t is formed. Secondly, dependent upon the further value $v_{S2}.t$ of the movement variable v associated with the time point t and of the further statistical sensor accuracy value $\sigma s\_v_{S2}.t$ of the further sensor S2 determined for this further value $v_{S2}.t$, a further test variable value $TG_{S2}.t$ associated with the time point t is formed.

The formation of the test variable value $TG_{S1}.t$ takes place in the substeps Vi to Vvii of FIG. 7.

The formation of the further test variable value $TG_{S2}.t$ takes place according to FIG. 7 as follows:

In the substep Viii, the difference is determined from the further value $v_{S2}.t$ of the movement variable v and the expected value $v^*.t$ of the movement variable v as a further innovation value $d_{S2}.t$.

In the substep denoted here as Vvi, the sum of the accuracy value $\sigma\_v^*.t$ of the expected value $v^*.t$ of the movement variable v and the further sensor accuracy value $\sigma s\_v_{S2}.t$ is determined as a further innovation accuracy value $\sigma\_d_{S2}.t$.

And in the substep Vvii, the quotient is determined from the modulus $|d_{S2}.t|$ of the further innovation value $d_{S2}.t$ and the further innovation accuracy value $\sigma\_d_{S2}.t$ as the further test variable value $TG_{S2}.t$.

After the formation of the test variable value $TG_{S1}.t$ and the further test variable value $TG_{S2}.t$, in the method step denoted as V215 in FIG. 5, on a comparison, the test variable value $TG_{S1}.t$ is now compared with the specified test bound TS. Furthermore, on an additional comparison, the further test variable value $TG_{S2}.t$ is compared with the specified test bound TS.

In the method step denoted as V216, it is tested again whether the timer T is running.

The assumption regarding the existence of a systematic deviation sA is made as follows:
  if the test variable value $TG_{S1}.t$ associated with the time point t is larger than the specified test bound TS and/or if the further test variable value $TG_{S2}.t$ associated with the time point t is larger than the specified test bound TS, then in the method step V217, the existence of a systematic deviation sA at the time point t is assumed,
  if the test variable value $TG_{S1}.t$ associated with the time point t and the further test variable value $TG_{S2}.t$ associated with the time point t are smaller than the specified test bound TS and the timer T is also running, then in the method step V218, the existence of a systematic deviation sA at the time point t is not precluded,
  if the test variable value $TG_{S1}.t$ associated with the time point t and the further test variable value $TG_{S2}.t$ associated with the time point t are smaller than the specified test bound TS and the timer T is also not running, then in the method step V219, the existence of a systematic deviation sA at the time point t is precluded.

Figure 6:
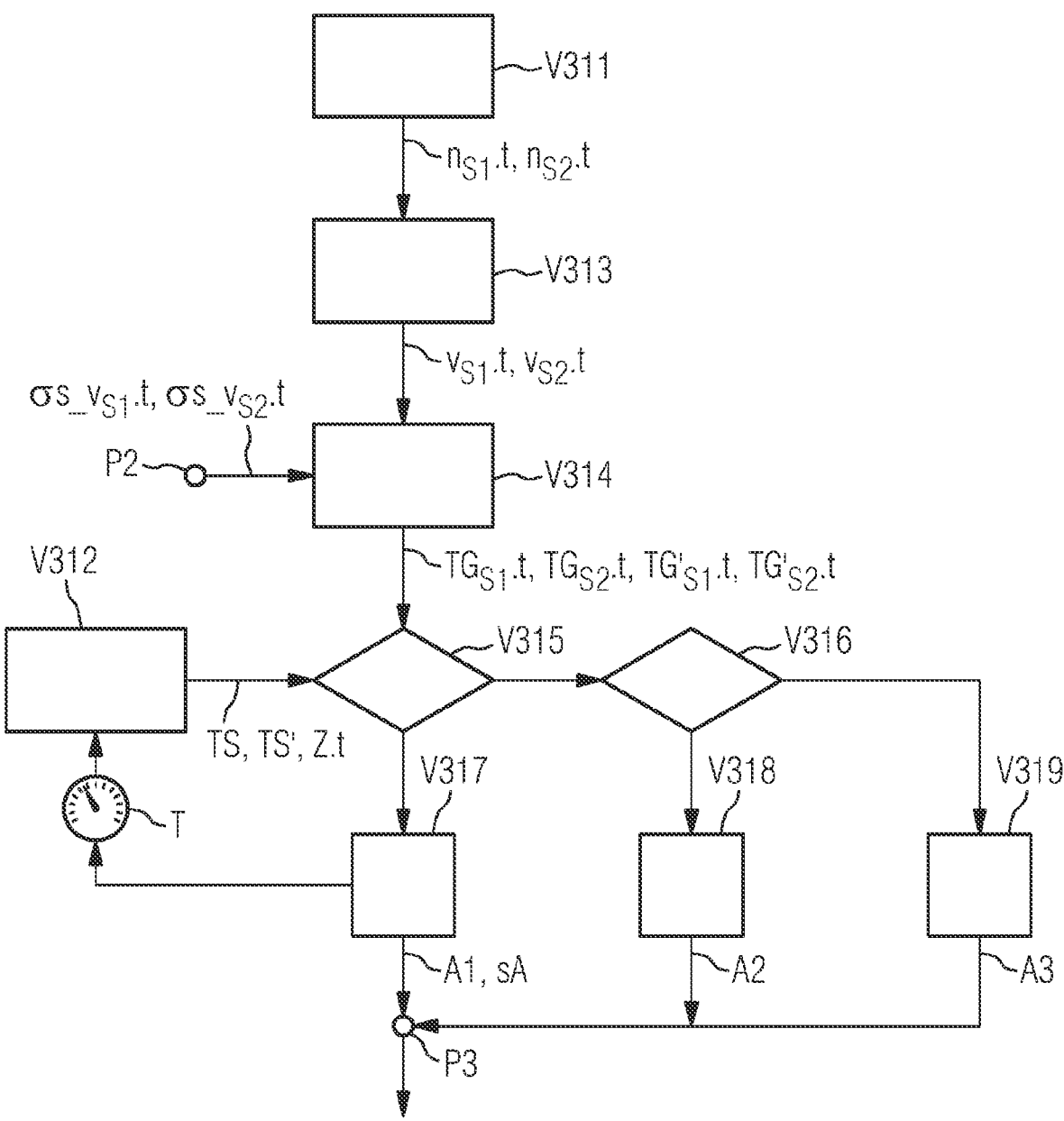

FIG. 6 shows a fourth embodiment of the second of the two partial methods. This is used if the further sensor S2 also again provides a further measurement value $n_{S2}.t$ associated with the time point t and if, additionally aside from the one test variable value $TG_{S1}.t$, an additional test variable value $TG'_{S1}.t$ and aside from the further test variable value $TG_{S2}.t$, a further additional test variable value $TG'_{S2}.t$ are determined. Therein, accordingly, apart from the one test bound TS, an additional test bound is again also specified.

The assumption regarding the existence of a systematic deviation sA is then made as follows:
  if at least one of the following conditions applies:
    the test variable value $TG_{S1}.t$ associated with the time point t is larger than the specified test bound TS,
    the further test variable value $TG_{S2}.t$ associated with the time point t is larger than the specified test bound TS,
    the additional test variable value $TG'_{S1}.t$ associated with the time point t is larger than the specified additional test bound TS',
    the additional further test variable value $TG'_{S2}.t$ associated with the time point t is larger than the specified additional test bound TS',
  then in the method step V317, the existence of a systematic deviation sA at the time point t is assumed,
  if, firstly, the test variable value $TG_{S1}.t$ and the further test variable value $TG_{S2}.t$ are smaller than the specified test bound TS and, secondly, the additional test variable value $TG'_{S1}.t$ and the additional further test variable value $TG'_{S2}.t$ are smaller than the specified additional test bound TS' and the timer T is also running, then in the method step V318, the existence of a systematic deviation sA at the time point t is not precluded,
  if, firstly, the test variable value $TG_{S1}.t$ and the further test variable value $TG_{S2}.t$ are smaller than the specified test bound TS and, secondly, the additional test variable value $TG'_{S1}.t$ and the additional further test variable value $TG'_{S2}.t$ are smaller than the specified additional test bound TS' and the timer T is also not running, then in the method step V319, the existence of a systematic deviation sA at the time point t is precluded.

Summarizing, it can therefore be established that during the first of the two partial methods which can also be designated the calibration method, at least the following steps are provided if the velocity of the vehicle forms the movement variable:
  traveling at different velocities with careful acceleration and braking of the vehicle when the velocity is changed,
  low pass filtration of the measurement values,
  calculating the accuracies of the different sensors for the whole journey, and
  iteratively fitting a regression line with the aid of the method of least squares. Therein, sliding and spinning processes excluded by static tests and calculation of the regression line repeated. Carry out until no systematic influences exist.

The result of the first partial method is the accuracies of the respective sensors.

The second of the two partial methods, which can also be designated the spinning and sliding detection method, then comprises, for example, the following further steps:
  calculating the expected velocity of the vehicle at the time point of the occurrence of a measurement value (for example, an incremental position sensor measurement value) with the aid of a movement model (for example, by means of an extended Kalman filter),
  calculating the difference (here, preferably the velocity difference) between the calculated expected velocity and the measured velocity calculating the accuracy of the velocity difference calculating the test bound for a specified probability of error, alpha calculating the test variable value comparing the test variable value with the test bound.

If the test variable value is larger than the test bound, then a systematic effect, for example, spinning or sliding exists.

With the use of the timer in the manner described, a false assertion that no slippage or no spinning has occurred when it is actually the case is prevented.

The following can be regarded as substantial advantages of the method according to the invention:

the method functions reliably regardless of the vehicle (vehicle type) and can therefore be offered flexibly for the widest variety of vehicles (vehicle types) for first installation or retrofitting.

the arrangement suitable for carrying out the method can be easily installed (implemented) or retrofitted. The arrangement consists of very few components—it is therefore very economical with regard to its first procurement—and also involves correspondingly low maintenance and service costs; also with regard to the software of the computer unit, by means of which individual steps of the method are carried out.

the method requires little computing power. The number of comparisons made is no greater than the number of sensors present.

as many sensors as required can be switched in or out dynamically. The method per se already functions with the use of just one sensor. However, it is advantageous to use at least two sensors. The detection of slippage or spinning is therefore based upon at least two participating sensors. Dedicated test sensors are not required. For example, it is advantageous to fasten at least two incremental position sensors on train axles that are sufficiently differently driven or in which the external influence from the environment in combination with the method according to the invention leads to sufficiently strong variation in the calculated distance values of the sensors among themselves. However, the method can, in principle, use as many sensors as desired, in particular, incremental position sensors such as are currently already present on the train. In place of or, in addition to, incremental position sensors, in the method according to the invention, so-called absolute sensors such as GNSS or Doppler radar units can be incorporated. However, Doppler radar units or GNSS reference sensors are not necessary for the method.

the input variables for the method are the measurement values and their statistics. Properties that are typical of the vehicle do not have to be made known for the method.

the method is distinguished by having a very high detection rate for sliding and wheelslip; previous tests have shown a detection rate of 100% and no false detection of non-existent sliding or wheelslip. Due to the reliable detection of sliding and wheelslip, the confidence intervals can be reduced in a timely manner.

the first partial method (the calibration method set out above) for determining the statistics of the sensors (individual accuracies of the sensors) can be carried out once for the sensor type at the manufacturer or more often during continuing operation and is substantially constant for each sensor type.

The invention claimed is:

1. A method for detecting systematic deviations during determination of a movement variable of a ground-based vehicle, which comprises the steps of:
    determining a value of the movement variable associated with a time point on a basis of a measurement value, associated with the time point, of at least one sensor;
    forming a test variable value associated with the time point dependent upon the value, associated with the time point, of the movement variable and upon a statistical sensor accuracy value of the at least one sensor determined for the value;
    further forming the test variable value in dependence on an expected value of the movement variable for the time point;
    comparing the test variable value with a specified test limit, in order to make an assumption, dependent upon a comparison result obtained from a comparison, with regard to an existence of a systematic deviation;
    determining an expected system state of the ground-based vehicle or the time point on a basis of a movement model applied to a previous system state of the ground-based vehicle;
    determining the expected value of the movement variable for the time point on a basis of a transfer model applied to the expected system state; and
    changing the movement variable of the ground-based vehicle such that a slippage of wheels of the ground-based vehicle on a ground or rails is substantially prevented by brakes of the ground-based vehicle or by a drive of the ground-based vehicle.

2. The method according to claim 1, which further comprises:
    starting a timer when the assumption occurs that the systematic deviation exists; and
    reading out an operational state of the timer at the time point.

3. The method according to claim 2, which further comprises forming an additional test variable value and, in a course of an additional comparison, the additional test variable value is compared with a specified additional test limit in order to make an assumption regarding the existence of the systematic deviation dependent also upon an additional comparison result obtained during the additional comparison.

4. The method according to claim 3, which further comprises:
    obtaining, via at least one further sensor, a further measurement value associated with the time point;
    determining a further value of the movement variable associated with the time point on a basis of the further measurement value; and
    forming a further test variable value associated with the time point and dependent upon the further value, associated with the time point, of the movement variable and upon a statistical sensor accuracy value of the at least one further sensor determined for the further value, and, in a course of a further comparison, the further test variable value is compared with the specified test limit, in order to make the assumption, dependent also upon a further comparison result obtained from the further comparison, with regard to the existence of the systematic deviation.

5. The method according to claim 4, which further comprises forming an additional further test variable value, and, in a course of an additional further comparison, the additional further test value is compared with a specified additional test limit in order to make the assumption regarding the existence of the systematic deviation, dependent also upon an additional further comparison result obtained during the additional further comparison.

6. The method according to claim 2, wherein the assumption regarding the existence of the systematic deviation is made as follows:
   if the test variable value associated with the time point is larger than the specified test limit, then the existence of the systematic deviation at the time point is assumed;
   if the test variable value is smaller than the specified test limit and the timer is also running, then the existence of the systematic deviation at the time point is not precluded; and
   if the test variable value is smaller than the specified test limit and the timer is also not running, then the existence of the systematic deviation at the time point is precluded.

7. The method according to claim 3, wherein the assumption regarding the existence of the systematic deviation is made as follows:
   if the test variable value associated with the time point is larger than the specified test limit and/or if the additional test variable value is larger than the specified additional test limit, then the existence of the systematic deviation at the time point is assumed;
   if, first, the test variable value is smaller than the specified test limit and, second, the additional test variable value is smaller than the specified additional test limit and the timer is also running, then the existence of the systematic deviation at the time point is not precluded; and
   if, first, the test variable value is smaller than the specified test limit and, second, the additional test variable value is smaller than the specified additional test limit and the timer is also not running, then the existence of the systematic deviation at the time point is precluded.

8. The method according to claim 4, wherein the assumption regarding the existence of the systematic deviation is made as follows:
   if the test variable value associated with the time point is larger than the specified test limit and/or if the additional test variable value associated with the time point is larger than the specified test limit, then the existence of the systematic deviation at the time point is assumed;
   if the test variable value associated with the time point and the further test variable value associated with the time point are smaller than the specified test limit and the timer is also running, then the existence of the systematic deviation at the time point is not preclude; and
   if the test variable value associated with the time point and the further test variable value associated with the time point are smaller than the specified test limit and the timer is also not running, then the existence of the systematic deviation at the time point is precluded.

9. The method according to claim 5, wherein the assumption regarding the existence of the systematic deviation is made as follows:
   if at least one of the following conditions applies then the existence of the systematic deviation at the time point is assumed:
      the test variable value associated with the time point is larger than the specified test limit;
      the further test variable value associated with the time point is larger than the specified test limit;
      the additional test variable value associated with the time point is larger than the specified additional test limit; or
      the additional further test variable value associated with the time point is larger than the specified additional test limit;
   if, first, the test variable value and the further test variable value are smaller than the specified test limit and, second, the additional test variable value and the additional further test variable value are smaller than the specified additional test limit and the timer is also running, then the existence of the systematic deviation at the time point is not precluded; and
   if, first, the test variable value and the further test variable value are smaller than the specified test limit and, second, the additional test variable value and the additional further test variable value are smaller than the specified additional test limit and the timer is also not running, then the existence of the systematic deviation at the time point is precluded.

10. The method according to claim 1, which further comprises determining the statistical sensor accuracy value on a basis of a sensor characteristic curve or sensor function previously determined for the at least one sensor.

11. The method according to claim 10, wherein during a real or simulated test journey of the ground-based vehicle or of a test vehicle used in its place, by means of the at least one sensor or a test sensor of a same sensor type used in its place, test measurement values are captured and, on a basis of the test measurement values, test values of the movement variable are determined and on a basis of the test values of the movement variable for the at least one sensor, a variation of its statistical sensor accuracy dependent upon the movement variable in a form of the sensor characteristic curve and/or the sensor function is determined.

12. The method according to claim 11, which further comprises:
   forming low pass filter values from the test values using low pass filtration;
   determining a sliding standard deviation for each of the test values on a basis of the low pass filter values; and
   fitting a regression line into a representation formed thereafter of the sliding standard deviations over a moduli of the test values, wherein the regression line shows a variation of the statistical sensor accuracy of the at least one sensor dependent upon the movement variable.

13. The method according to claim 1, which further comprises:
   determining a difference between the value of the movement variable and the expected value of the movement variable as an innovation value.

14. The method according to claim 13, which further comprises:
   determining a system state accuracy value of the expected system state on a basis of the movement model applied to a previous system state accuracy value and of a transmission model applied to a specified system noise;
   determining an accuracy value of the expected value of the movement variable on a basis of the system state accuracy value of the expected system state and of the transfer model;
   determining a sum of the accuracy value of the expected value of the movement variable and the statistical sensor accuracy value as an innovation accuracy value; and
   determining a quotient from a modulus of the innovation value and the innovation accuracy value as the test variable value.

15. The method according to claim 13, which further comprises:
- determining a residual value as a product of the innovation value and a specified weighting factor;
- determining a residual accuracy value as a product of the specified weighting factor multiplied by minus one and the statistical sensor accuracy value; and
- determining a quotient from a modulus of the residual value and the residual accuracy value as the additional test variable value.

16. The method according to claim 1, wherein the specified test limit is determined as a quantile of a standard normal distribution of an order $1-\alpha/2$, wherein a value is specified for $\alpha$ as a probability of error.

17. The method according to claim 3, wherein the additional test limit is preferably determined as a quantile of a standard normal distribution of an order $1-\alpha/2$, wherein an additional value is specified for $\alpha$ as a probability of error.

18. A configuration for detecting systematic deviations during determination of a movement variable of a ground-based vehicle, the configuration comprising:
- at least one sensor; and
- a computer configured to detect the systematic deviations during the determination of the movement variable of the ground-based vehicle, said computer being programmed to:
  - determine a value of the movement variable associated with a time point on a basis of a measurement value, associated with the time point, of said at least one sensor;
  - form a test variable value associated with the time point dependent upon the value, associated with the time point, of the movement variable and upon a statistical sensor accuracy value of said at least one sensor determined for the value;
  - further form the test variable value in dependence on an expected value of the movement variable for the time point;
  - compare the test variable value with a specified test limit, in order to make an assumption, dependent upon a comparison result obtained from a comparison, with regard to an existence of a systematic deviation:
- determine an expected system state of the ground-based vehicle or the time point on a basis of a movement model applied to a previous system state of the ground-based vehicle;
- determine the expected value of the movement variable for the time point on a basis of a transfer model applied to the expected system state;
- change the movement variable of the ground-based vehicle such that a slippage of wheels of the ground-based vehicle on a ground or rails is substantially prevented by brakes of the ground-based vehicle or by a drive of the ground-based vehicle.

19. A ground-based vehicle, comprising:
said configuration according to claim 18.

* * * * *